July 16, 1963 R. C. NEWTON 3,097,765
APPARATUS FOR PUNCTURING AND DISPENSING A MEASURED
QUANTITY OF MATERIAL
Filed Aug. 26, 1959 2 Sheets-Sheet 1
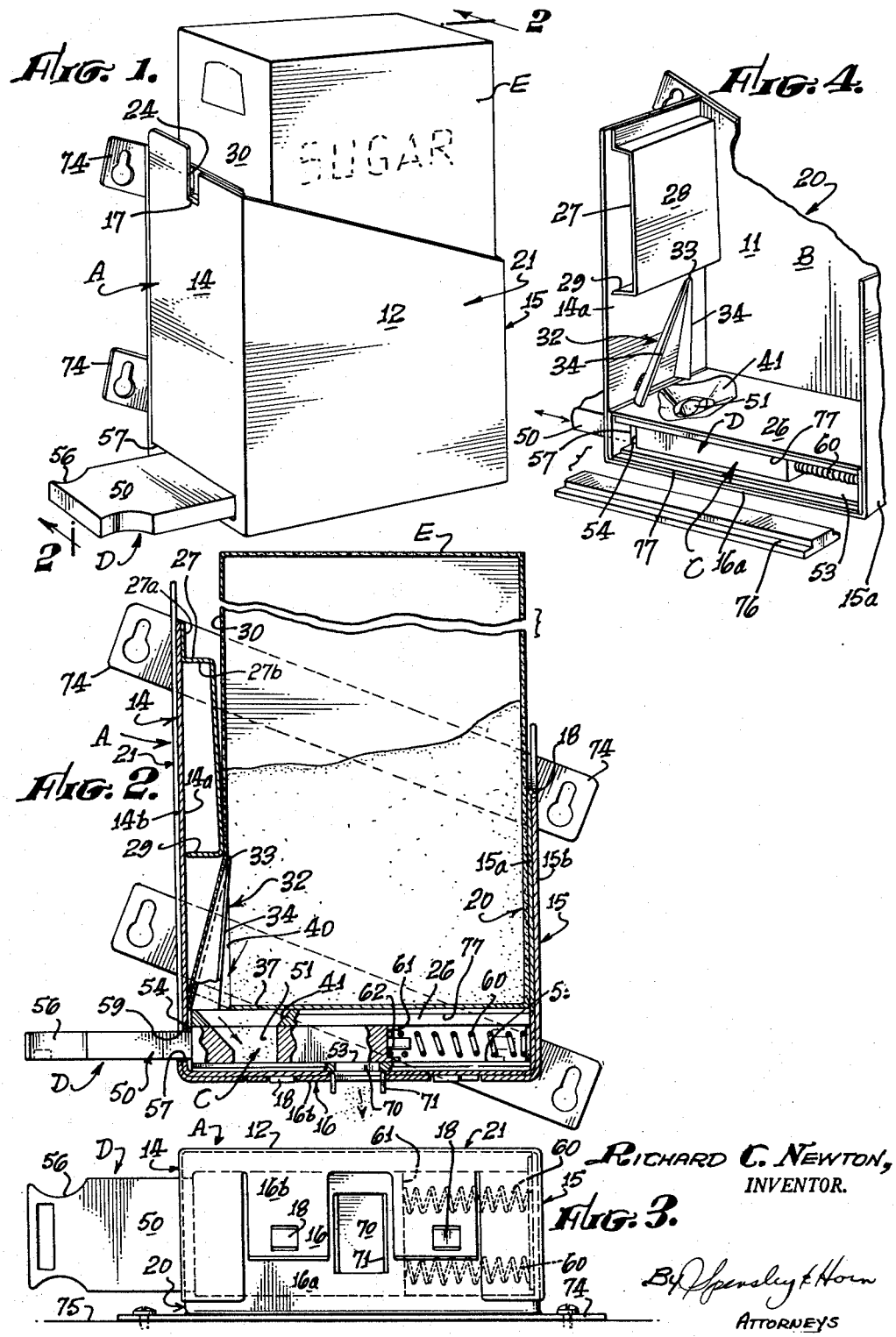
RICHARD C. NEWTON,
INVENTOR.
By Spensley & Horn
ATTORNEYS

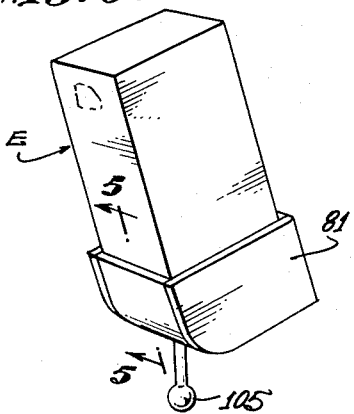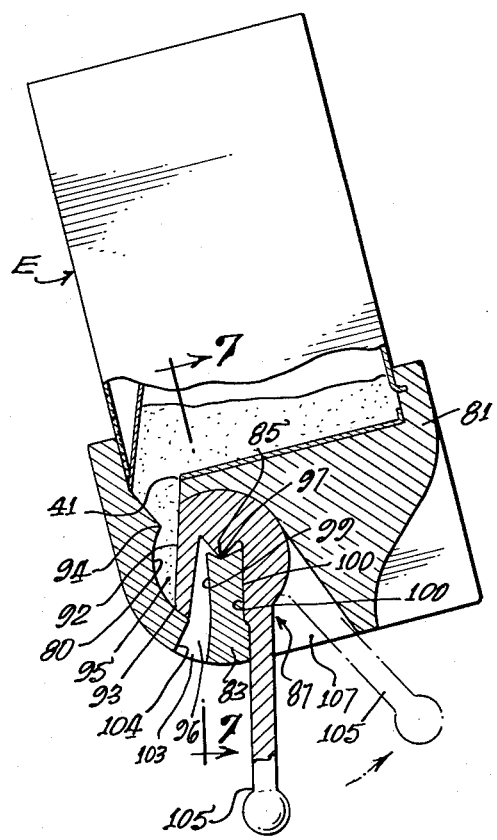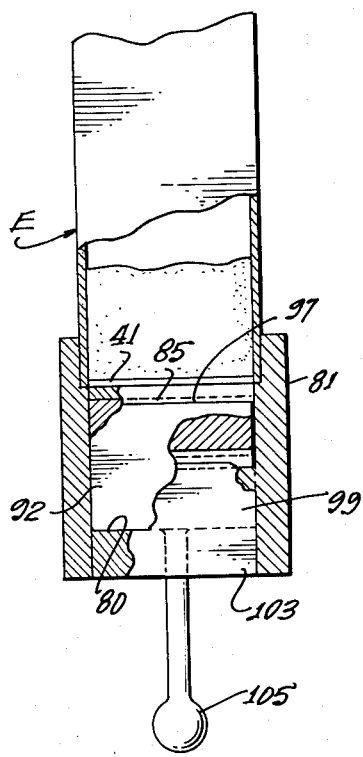

United States Patent Office 3,097,765
Patented July 16, 1963

3,097,765
APPARATUS FOR PUNCTURING AND DISPENSING A MEASURED QUANTITY OF MATERIAL
Richard Corlett Newton, 13869 Mercer St., Pacoima, Calif.
Filed Aug. 26, 1959, Ser. No. 836,268
3 Claims. (Cl. 222—82)

This invention relates to dispensing apparatus and more particularly to an apparatus for opening a package of particulate material and dispensing a measured quantity therefrom.

Although the present invention can be utilized for dispensing measured amounts of finely divided particulate material which is packaged, it is particularly devised and adapted to the dispensing of packaged sugar. Accordingly, the use of the device as a dispenser for measured amounts of sugar will be described throughout the following application as the presently preferred and illustrative form of the invention.

The supplying of sugar to users in eating establishments and other places where food and drink are served involves peculiar problems which are substantial due to the nature of the sugar itself. It is well known that the presence of loose or scattered sugar is very undesirable due to the ability of germs, insects and contaminants to exist and breed in the sugar. This problem is particularly acute due to the fact that the sugar is located at or near a place where food is being served. Accordingly, various methods of supplying sugar to the user are not approved by various health departments and food inspecting agencies. Common means of supplying sugar to a user such as placing an open receptacle or bowl on the table or other location where the sugar is to be used is disadvantageous not only from the health and contamination standpoint but also because of the propensity for wastage by the user when unmeasured quantities are available. In addition, the problem of scattering the sugar where it can lodge in other locations around the eating establishment also lends itself to nuisance and contamination. In order to properly dispense sugar it has been attempted to individually wrap cubes or other solid quantities. Among other disadvantages, however, such a solid state supply is expensive.

In order to provide and dispense sugar in a completely satisfactory manner it is necessary that the sugar at all times be contained within a closed container or receptacle and that the container or receptacle have no areas or points at which the sugar can lodge and remain for a considerable length of time. An ideal sugar container and dispenser must also be susceptible to easy cleaning and should dispense only a predetermined quantity.

Accordingly, it is an object of the present invention to provide a dispensing apparatus for particulate material such as sugar, which apparatus opens a packaged quantity of sugar within the apparatus such that it is not handled or exposed in a loose condition.

It is another object of the present invention to provide a dispensing apparatus for particulate material which meets rigid restrictions with respect to health and contamination in that the particulate material is kept completely covered at all times.

It is another object of the present invention to provide a sugar dispensing apparatus which can be easily dismounted and cleaned.

Yet another object of the present invention is to provide a sugar dispensing apparatus which contains no protrusions, recessions, depressions or irregularities therein in which sugar can become lodged.

Yet a further object of the present invention is to provide a sugar dispensing apparatus which measures a predetermined quantity of sugar to be dispensed in an efficient manner.

It is still another object of the present invention to provide a sugar dispensing apparatus which can be easily and economically manufactured and which has a minimum of moving parts subject to failure.

Still another object of the present invention is to provide a sugar dispensing apparatus which opens a packaged container of sugar when the package is inserted into the apparatus and dispenses all of the sugar from the package with no wastage thereof.

Yet another object of the present invention is to provide a sugar dispenser which meets the requirements of governmental health and sanitation departments and boards.

The present invention provides a dispenser for dispensing particulate material and comprises an open-ended receptacle adapted to receive a package of the material to be dispensed wherein the package is formed from a material which can be pierced such as cardboard, paper or foil. At one corner when the dispensing apparatus is in use, there is positioned a cutting edge adapted to engage a corner of the package. The cutting edge is so oriented with respect to the receptacle that as the package is inserted in the receptacle the package is pierced at a corner and the side of the package is moved away from the package to open the corner thereof. A dispensing mechanism is positioned in an operably connected manner at the lowermost end of the receptacle to receive a measured quantity of the particulate material from the opened corner of the package. The dispensing mechanism is so constructed that when operated and moved from a first position to a second position a predetermined quantity of particulate material is allowed to escape from the dispenser.

The novel features which are believed to be characteristic of the present invention both as to its organization and method of operation, together with further objects and advantages thereof, will be better understood from the following description considered in connection with the accompanying drawing in which presently preferred embodiments of the invention are illustrated by way of example. It is to be expressly understood, however, that the drawing is for the purpose of illustration and description only and is not intended as a definition of the limits of the invention.

In the drawing:

FIGURE 1 is a view in perspective of a presently preferred embodiment of the apparatus with a package of sugar contained therein in dispensing position;

FIGURE 2 is a view in section taken along line 2—2 of FIGURE 1;

FIGURE 3 is a bottom view partly in section of the embodiment illustrated in FIGURES 1 and 2;

FIGURE 4 is a partial view in perspective with one side of the apparatus removed to show the inner components thereof;

FIGURE 5 is a partial view in section showing an alternative embodiment of the present invention;

FIGURE 6 is a view in perspective of the embodiment of FIGURE 5; and,

FIGURE 7 is a view in section taken along line 7—7 of FIGURE 5.

Referring now to the drawing and particularly to FIGURES 1 through 4, the dispensing apparatus in its presently preferred form includes in general a housing A, a receptacle section B of said housing and a dispensing section C of the housing. A dispensing mechanism D is contained within the dispensing section and is operatively contained within the housing. For purposes of illustration, the embodiment shown is adapted to receive a package of sugar of predetermined size. For example, the particular embodiment shown is of a proper size to receive a two-pound box of sugar, which box is formed of cardboard and is generally rectangular in cross-sectional configuration. The type of package is well known to the art. In general, the dispensing apparatus is adapted to receive the package and to open the package when the package is inserted. After the package has been inserted and thereby opened, a predetermined quantity of sugar can be dispensed from the apparatus by operation of the dispensing mechanism.

The housing A is open at its upper end and is defined by first and second side walls 11 and 12 respectively, first and second end walls 14 and 15 respectively, and the bottom surface 16. The housing is generally rectangular in configuration and is formed by first and second housing sections which can be mated and joined together without the use of bolts or screws. That is, referring particularly to FIGURE 4, the first housing section includes the first side wall 11 and first and second end walls 14a and 15a respectively. A bottom surface 16a is also defined by the first housing section 20. Thus, the first housing section includes a side 11 with perpendicularly extending end walls and a perpendicularly extending bottom surface connecting the end surfaces, thus describing a section having three sides and a bottom surface all of which are formed by sharp angle bending and welding. The second housing section 21 is also three-sided with a bottom surface and includes the second sidewall 12 of the housing together with end walls 14b and 15b and a bottom surface 16b. The second housing section is formed similarly to the first but is mateable therewith in that the length of the side wall 12 and thus the distance between the end walls 14b and 15b is slightly greater than the distance between the end walls 14a and 15a of the first section by an amount which makes the end walls slidably mateable. That is, the ditsance between the end walls 14b and 15b is greater than the distance between the end walls 14a and 15a by a distance approximately equal to the thickness of the two end walls 14a and 15a such that when mated together the end walls 14b and 15b pass to the outside of the end walls 14a and 15a in sliding contact therewith. Similarly, the bottom surface 16b of the second section 21 passes under the bottom surface 16a of the first housing section.

The housing sections 20 and 21 are preferably maintained in the assembled position as shown in FIGURES 1 and 3 by friction engaging means such as a protrusion 17 stamped or extruded outwardly from the end wall 14a of the first section which is mateable with an opening 24 in the end wall 14b of the second section. Similar detent arrangements 18 are provided at the end walls 15a and 15b and the bottom surface 16a and 16b. Thus, the housing can be assembled by slidably mating the first and second housing sections until the various detents between the mating surfaces are engaged.

Positioned proximate the bottom surface of the housing but spaced upwardly therefrom by a predetermined distance is a dividing partition 26 which extends across the length and width of the housing to divide the housing into a receptacle section B and a dispensing section C. That is, the partition 26 is removably connected to the side wall 11 of the housing and to the inner surface of the end wall 14a and the end wall 15a. The partition is equal in width to the interior width of the housing such that when the housing sections are mated the partition 26 is substantially abutting the sidewall 12 of the second housing section 21. The partition 26 is parallel to the bottom surface 16 of the housing and forms the bottom surface of the receptacle section B of the housing. The interior length of the housing A, that is, the distance between the end walls 14 and 15, is substantially greater than the width of the package to be inserted therein, while the distance between the side walls 11 and 12 is substantially equal to but greater than the thickness of the package to be inserted. At the interior surface of the end wall 14 there is provided a spacing member 27 as shown in FIGURES 2 and 4 which is adapted to engage one side of the package or box E when the box is inserted into the housing. The spacing or guide member 27 is resiliently affixed to the front end wall 14 in order to guide the box E into the proper location for opening as described hereinafter. Thus, the guide member 27 is affixed forming an L-shaped upper end with the horizontal leg of the L inclined slightly upwardly from the horizontal position and affixing the vertical leg of the L at the upper end thereof to the end wall 14a and bent outwardly to form a guide surface 28 spaced from the end wall 14. The guide member 27 is so formed that the guide surface 28 is inclined somewhat inwardly and downwardly with respect to the side wall and the bottom end of the member 27 is bent to form a lower end 29 which extends toward the end wall 14 but is slightly spaced therefrom in the relaxed condition of the member. That is, the member 27 is formed of steel with a portion 27a formed at an angle relative to the portion 27b. The relaxed angle of bend is such that when the portion 27a is affixed to the slide wall 14a, the member is held outwardly as shown in dotted lines in FIGURE 2. The distance by which the surface 28 and the end 29 of the member are spaced from the end wall 14 is such that when the box E is inserted into the receptacle section B it will be urged toward the rear end wall 15 and guided into contact therewith until the box E forces the end 29 of the member into contact with the end wall 14 at which point the box is properly positioned to be opened as described hereinafter.

Within the receptacle portion B of the housing A is a cutter designated generally as 32. The cutter is formed, in this embodiment as shown in FIGURES 2 and 4, from sheet metal in a generally triangular convex-concave configuration. The base of the cutter extends substantially across the width of the housing and is affixed to the front wall 14a proximate the partition 26. The cutter extends upwardly and inwardly with respect to the receptacle portion, with the apex or cutter point 33 being spaced from the end wall 14 by a distance sufficient to engage the box E just inwardly of the side 30 thereof. That is, the cutter point 33 is spaced inward from the guide surface 28, by a distance approximately equal to the width of the material from which the box is formed, when the end 29 of the guide member abuts the surface 14a. The cutting edges 34 of the cutter 32 extend downward and outward from the point 33 to opposed points spaced inwardly from the end wall surface 14a. The cutter then tapers outwardly from the edge 34 to assume the convex-concave configuration. Thus, when a box E is forced into the receptacle portion B of the housing A, the guide member will position the box such that the point 33 of the cutter 32 enters the bottom surface 37 of the box just inside of the side 30. The edges 34 then cut a slot from the side 30 and the downwardly and outwardly tapering cutter forces the edge of the slotted material toward the end wall 14 thereby opening the lower corner of the box. Material in the box can flow therefrom due to the convex-concave configuration of the cutter.

Immediately below the base of the cutter 32, and thus below the opening 40 cut in the box E when in position, the partition 26 defines an opening 41 through which the particulate material can flow to the dispensing section C of the housing. As described hereinbefore, the partition 26 is spaced above the bottom surface 16 of the housing. Within the space defined the dispensing mechanism is positioned to deliver a predetermined quantity of the particulate material from the opening 41. In the embodiment shown in FIGURES 1 through 4 a dispensing slide 50 having a receiving port 51 of predetermined volume extending therethrough is used. The slide 50 is longitudinally slidably movable between the lower surface of the partition 26 and the bottom 53 of the dispensing section C of the housing. The slide is formed with a shoulder 54 which abuts the end wall 14 of the housing in the non-dispensing position shown in FIGURES 2 and 4. The operating end 56 of the slide 50 extends through an opening 57 in the end wall 14 to the exterior of the housing. The opening 57 in the end wall is provided by an opening through the end wall 14a of the first housing section 20 slightly larger in size than the operating end 56 of the slide but smaller than the shoulders 54 on the slide. A slot 59 mateable with the opening 57 is formed in the end wall 14b. The slide is thus inserted into the dispensing section by extending the operating end 56 through the opening 57 in the first housing section 20. The slot 59 in the second housing section then passes around the slide when the housing sections are mated.

Means are provided for urging the dispensing slide to the closed position. In the presently preferred embodiment springs 60 are mounted in compression between the inward end 61 of the slide and the second end wall 15 of the housing. The springs are maintained in position by mounting them into guide holes in the end 61 of the slide and over studs in the end wall 15. The studs are of such length that they can form stops to position the slide in the discharging position.

A discharge port 70 is formed through the bottom surface 16 of the housing and two guide plates extend downwardly bounding the discharge port on two sides. The port 70 is positioned approximately at the midpoint of the bottom surface, or in register with the receiving port 51 of the slide in the discharge position of the slide. Thus, the springs 60 urge the slide outward to the closed position shown in FIGURES 2 and 4 at which the receiving port 51 is in register with the opening 41 from the receptacle section B. When the slide is pushed inward it is movable until the receiving port 51 is in register with the discharge port 70. The volume of the receiving port is of desired size, for example, one-half or one level teaspoon. Detents in the sliding mechanism can be used to allow discharge of only part of the volume by allowing only partial travel of the slide.

Mounting straps 74 can be affixed to the first side wall 11 of the housing and oriented at an angle. Accordingly, the apparatus is preferably mounted at an angle to assure discharge of all of the material from the box E. The housing A can be mounted on a vertical surface 75 by orienting the straps 74 horizontally such that the opening 40 in the box E is at the lowermost point thereof to assure flow of all material in the box through the opening.

To prevent opening of the dispensing section when the housing sections are separated a separate dispensing section side member 76 can be frictionally engaged by means of shoulders 77 formed in the position 26 and bottom surface 53 of the dispensing section.

Thus, in operation, a box E of sugar is inserted through the open upper end of the housing into the receptacle section B. As the box E is inserted it is opened as described hereinabove. A measured volume of sugar fills the receiving port 51 of the slide 50. As the slide is moved inward the sugar contained in the receiving port is moved over the discharge port 71 and discharged therethrough.

Referring now to FIGURE 5, an alternative form of dispensing mechanism is shown. In this embodiment a pivotal dispenser is used. The receptacle portion B and cutter assembly are similar to that previously described but the dispensing section C defines a transversely extending partially cylindrical volume 80 in a bottom member 81 of the housing which member is of a substantial thickness. The cylindrical volume 80 is in communication with the opening 41 from the receptacle section B beneath the box opening 40. A transversely extending pivot bar 83 extends across the housing bottom member 81. The pivot bar 83 extends radially downward from the center of the cylindrical volume 80 and defines a depression at the upper surface thereof with a pivot point 85 substantially at the transverse centerline of the cylinder. A dispensing member 87 is supported by the transverse pivot point 85 and is pivotally mounted thereon. The dispensing member is free swinging from the pivot point and is a partial cylinder in configuration with the pendulum bar 105 extending downwardly therefrom. That is, the dispensing member 87 includes a body section 90 which is a cylinder of substantially equal diameter to the cylindrical volume 80. A chord section is removed from the cylindrical body such that the chord line 92 and the cylinder wall between the arcuate points 93 and 94 on the cylindrical wall defines the receiving volume 95 of the dispenser. The cylinder body 90 also has a radial section 96 removed therefrom which is greater in width than the width of the pivot bar 83. A pivot point 97 is defined at the upper end of the radial section 96 which is mateable with and pivotally mounted upon the pivot point 85. The pivot bar 83 and radial section 96 are interdependent such that the cylinder body 90 is rotatable from the open position, at which the surface 98 abuts the pivot bar surface 99, to the closed position, at which the radial surface 100 abuts the opposite pivot bar surface 101. A discharge port 103 is defined in the circumferential end 104 of the cylindrical volume. The discharge port 103, arcuate points 93 and 94 and surface 28 are interdependent such that the weight of the pendulum bar 105 causes the arcuate point 93 to close the discharge port 103 while the arcuate point 94 opens the receiving volume 95 to flow of material. A longitudinally extending slot 107 in the bottom member allows travel of the pendulum bar 105 to the position shown in phantom in FIGURE 5, which is the discharge position.

Thus, in operation, the housing is mounted such that the pendulum bar forming the operating arm assumes the lowermost position at which the receiving volume is open to the flow of material through the receptacle opening 41. When the operating arm is swung rearward, by pushing it with a cup, for example, the cylindrical body rotates to close the opening 41 and open the discharge port 103 from which the measured volume of sugar flows.

Accordingly, the present invention provides an improved measuring dispenser for sugar and other particulate material. By utilizing the apparatus of the present invention to dispense boxed material the box is not opened or handled prior to insertion of the box into the apparatus. Due to the construction of the apparatus extreme cleanliness is assured with no traps or protrusions in which the material can lodge.

What is claimed is:

1. A dispensing apparatus for supplying a measured quantity of particulate material from a package of such material comprising: a five sided open housing having the open side generally upwardly oriented, said housing defining a receptacle section adapted to receive said package and a dispensing section beneath said receptacle section; a cutter member mounted to the inner surface of a side wall of said receptacle section near the bottom thereof and extending upwardly and inwardly into said receptacle section, said cutter being positioned to engage said package at a lowermost portion thereof; guide means resiliently mounted in said receptacle section above said cutter member to guide said package into contact with the said cutter member; an opening in said receptacle defined beneath said cutter member, said dispensing section having a discharge port through the lower side thereof; said dispensing section housing a transverse cylindrical volume; a dispensing member pivotally mounted in said volume; said dispensing volume communicating with said opening and said port, said dispensing member including a transversely oriented pivotal cylindrical body mateable with and pivotally mounted within said cylindrical volume, said cylindrical body having a radial section removed therefrom, the innermost portion of said radial section defining a linear pivotal mounting surface extending along the longitudinal axis of said cylindrical body, said cylindrical body being pivotally mounted at said pivotal surface to a pivot bar secured to said dispensing section and extending into said radial section, the rotational movement of said cylindrical body being limited by the extent of said radial section between first and second pivotal positions, said cylindrical body having a flat surface formed thereon to define a chord section, said chord section and a cylindrical wall of said cylindrical volume thereby defining a receiving volume, said receiving volume being in communication with said opening at said first pivotal position of said cylindrical body and in communication with said discharge port from said cylindrical volume at said second pivotal position of said cylindrical body; a pendulum bar affixed to said cylindrical body extending radially therefrom through an opening in the said dispensing section, said pendulum bar being affixed to said cylindrical body at a predetermined position such that by force of gravity said pendulum bar urges said cylindrical body to said first pivotal position, said pendulum bar being selectively movable to said second pivotal position.

2. A dispensing apparatus for supplying a measured quantity of particulate material from a package of such material comprising: a generally rectangular housing having a substantially planar bottom surface and an open top, said housing defining an uppermost receptacle section adapted to receive said package and a lowermost dispensing section beneath said receptacle section, said dispensing section having a transverse cylindrical volume including an inlet port at the uppermost portion thereof in communication with the lowermost portion of said receptacle section and a discharge port at the lowermost portion thereof in communication with an opening in the planar bottom surface of said housing; a cutter member mounted to the inner surface of a side wall of said receptacle section near the bottom thereof and over said inlet port, said cutter member extending upwardly and inwardly into said receptacle section for engagement with a package inserted into said receptacle section; guide means resiliently mounted in said receptacle section above said cutter member to guide said package into contact with said cutter member and a dispensing member pivotally mounted within the cylindrical volume of said dispensing section, said dispensing member including a partially cylindrical body of a diameter substantially equal to but slightly less than the diameter of said cylindrical volume, said cylindrical body having a chord section and having a radial hollow section, the innermost portion of said radial section defining a linear pivotal mounting surface extending along the longitudinal axis of said cylindrical body, said cylindrical body being pivotally mounted at said pivotal surface to a pivot bar secured to said dispensing section and extending into said radial section, the rotation of said cylindrical body being limited by the extent of said radial section between first and second pivotal positions, said chord section being oriented to define a receiving volume which is in communication with said inlet port at said first pivotal position and in communication with said discharge port at said second pivotal position, said cylindrical body being selectively movable between said first and second pivotal positions.

3. The apparatus as defined by claim 2 in which said dispensing member includes an operating arm of substantial weight so oriented to gravitationally urge said cylindrical body to said first pivotal position.

References Cited in the file of this patent

UNITED STATES PATENTS

| | | |
|---|---|---|
| 1,369,740 | Gibbons | Feb. 22, 1921 |
| 1,869,120 | Thoeming et al. | July 26, 1932 |
| 1,885,978 | Bobrick | Nov. 1, 1932 |
| 1,918,112 | Kronquest et al. | July 11, 1933 |
| 2,031,616 | Nall | Feb. 25, 1936 |
| 2,135,378 | Allen | Nov. 1, 1938 |
| 2,603,385 | Toth | July 15, 1952 |
| 2,634,026 | Yuan | Apr. 7, 1953 |
| 2,655,286 | Barbaro | Oct. 13, 1953 |

FOREIGN PATENTS

| | | |
|---|---|---|
| 207,611 | Great Britain | Nov. 30, 1923 |